United States Patent [19]

Kitami

[11] Patent Number: 5,437,031
[45] Date of Patent: Jul. 25, 1995

[54] INTERPROCESS COMMUNICATIONS CONTROL SYSTEM

[75] Inventor: Toshikazu Kitami, Kanagawa, Japan

[73] Assignee: Fuji Xerox Co., Ltd., Tokyo, Japan

[21] Appl. No.: 202,674

[22] Filed: Feb. 25, 1994

Related U.S. Application Data

[63] Continuation of Ser. No. 594,967, Oct. 10, 1990, abandoned.

[51] Int. Cl.6 .......................................... G06F 15/167
[52] U.S. Cl. .............................. 395/650; 364/DIG. 1; 364/228.1; 364/240; 364/246.6; 364/280; 364/281.6; 364/281.7
[58] Field of Search ..................... 395/650; 364/228.1, 364/281.6

[56] References Cited

U.S. PATENT DOCUMENTS

| | | | |
|---|---|---|---|
| 4,214,304 | 7/1980 | Shimizu et al. | 364/200 |
| 4,449,181 | 5/1984 | Young et al. | 364/200 |
| 4,937,737 | 1/1990 | Schwane et al. | 395/650 |
| 5,230,065 | 7/1993 | Curley et al. | 395/200 |
| 5,257,374 | 10/1993 | Hammer et al. | 395/650 |

OTHER PUBLICATIONS

An Introduction to Operating Systems: H. M. Dietel Addison-Wesley Publishing Co., 1983, pp. 526–529.
Operating System Concepts: Peterson and Silberschatz, Addison-Wesley Publishing Co., 1985, pp. 349–355.

*Primary Examiner*—Kevin A. Kriess
*Assistant Examiner*—Kakali Chaki
*Attorney, Agent, or Firm*—Finnegan, Henderson, Farabow, Garrett & Dunner

[57] ABSTRACT

The improved system for controlling the interprocess communications between a managing process which is a process for managing a plurality of client processes that transmits data to and from the managing process. The system includes an exclusive control means by which only one client process for performing interprocess communications with the managing process is selected from the plurality of client processes, a shared memory which can be referenced by both the managing process and the client processes to perform data exchange between the managing process and each client, and a notifying means which notifies the managing process of data setting in the shared memory by each client.

4 Claims, 5 Drawing Sheets

SHARED MEMORY FOR EXCDIR

| RequestType |
|---|
| Contets |

RequestType : THE TYPE OF REQUEST FROM A CLIENT

Contets : DATA TO BE TRANSFERRED FROM EXCDIR TO THE WINDOW MANAGER

SHARED MEMORY FOR THE WINDOW MANAGER

| ClientBufferStatus |
|---|
| cwd |

ClientBufferStatus : THE STATUS OF THE SHARED MEMORY FOR CLIENTS cwd : CURRENT DIRECTORY FOR THE WINDOW MANAGER

INTERPROCESS COMMUNICATIONS CONTROL SYSTEM

This application is a continuation of U.S. application Ser. No. 07/594,967, filed Oct. 10, 1990, now abandoned.

BACKGROUND OF THE INVENTION

1. Field of the Invention

This invention relates to a system capable of controlling the interprocess communications between a managing process and a plurality of client processes.

2. Discussion of the Related Art

Several systems are known that control interprocess communications whereby computer processes or programs may communicate with other computer processes. According to a system that has been known for many years, a shared memory that can be accessed by both a managing process and client processes is provided and data is read or written into this shared memory to perform data exchange between the managing process and the client processes. In order to prevent competition for the shared memory between individual client processes, this system adopts a method of exclusive control such as a semaphore.

In the conventional interprocess communications control system using a shared memory, it often occurs that requests for processing sent from a plurality of client processes are not transmitted to the managing process in such a way that requested jobs are correctly executed by the latter. Further, the client processes are unable to determine the status of processing by the managing process after they have written their requests for processing into the shared memory. Thus, competition for the shared memory between the respective client processes cannot be totally eliminated to insure system reliability.

SUMMARY OF THE INVENTION

The present invention has been made in view of the above circumstances and has as an object providing an interprocess communications control system that facilitates the control of a plurality of client processes by the managing process so that it is capable of correctly servicing the requests for processing sent from the client processes.

A further object of the present invention is to provide an interprocess communications control system that has a means of informing each client processes of the status of processing by the managing process so that the competition for the shared memory between the individual client processes can be totally eliminated to insure high system reliability.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention comprises a data processing system for controlling the interprocess communications between a managing process and a plurality of client processes, wherein each one of the client processes may communicate data to the managing process. The system comprises an exclusive control means, coupled to the plurality of client processes, for excluding a second client process of the plurality of client processes from communicating with the managing process when a first client process of the plurality of client processes is communicating with the managing process, a shared memory which is coupled to the managing process and the exclusive control means and which may be accessed by the managing process and each of the plurality of client processes, via the exclusive control means, to communicate the data between the managing process and the plurality of client processes, and a notifying means, coupled to the managing process and the plurality of client processes, for notifying the managing process that the first client process has stored the data in the shared memory to be retrieved by the managing process.

In the first aspect of the present invention, when a client process has completed the writing of data into the shared memory, the managing process is notified of that event by the notifying means and is capable of reading the relevant client information from the shared memory in accordance with that notification. Thus, information is correctly received by the managing process from the client process so that the job requested by the client process can be executed in the proper manner.

According to another aspect of the present invention, the shared memory consists of two parts, one being a shared memory for client processes into which the request of each client process and data associated with that request are written by the client process and from which they are read by the managing process, and the other being a shared memory for the managing process that can be accessed by both the client processes and the managing process and which stores the status of the managing process. The shared memory for client processes is used to transfer the request of each client process and the associated data from the client process to the managing process and the completion of such request and data writing into said shared memory is notified to the managing process by the notifying means, so that the requests for processing sent from the client processes are transmitted one by one to the managing process in a proper manner. In response to that notification, the managing process indicates in the shared memory for the managing process not only that it is servicing the request for processing made by a certain client process but also that the servicing has been completed, so that the other client processes can be aware of the status of the managing process. In this way, the competition for the shared memory between individual client processes is totally eliminated to insure control for highly reliable interprocess communications.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In drawing legends, a managing process is labeled "manager" and a client process is labeled "client." In the drawings.

DETAILED DESCRIPTION OF THE PREFERRED EMBODIMENT

Figure 1:
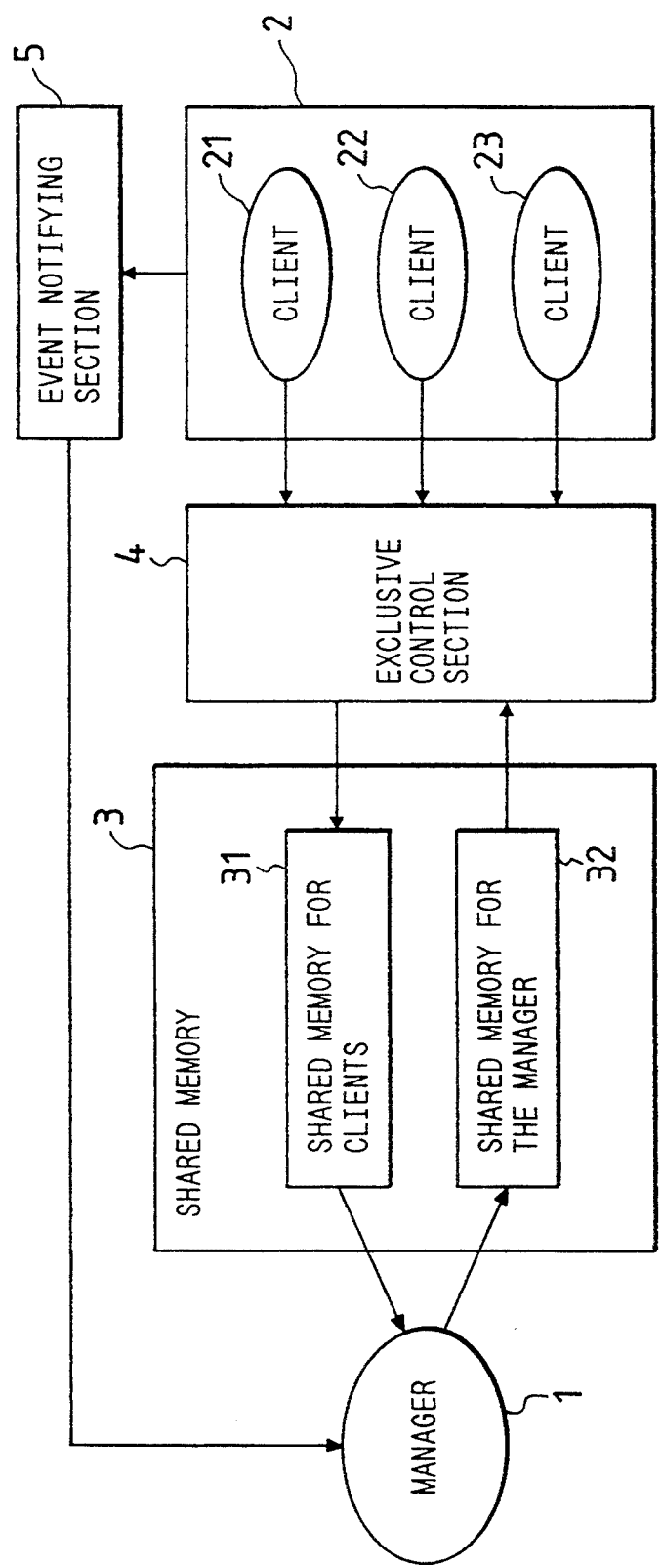
FIG. 1 is a diagram of the different components of an apparatus according to an example of the present invention for controlling interprocess communications.

FIG. 1 is a block diagram showing the composition of an example of the apparatus for controlling interprocess communications according to the present invention. This apparatus is basically intended to control the communications between a managing process or manager 1 which is a single process and a group of client processes or clients 2 which are a plurality of processes to perform data exchange with the manager 1. However, the broad principles of this invention may apply to interprocess communications between multiple managing processes and client processes.

As shown in FIG. 1, the apparatus includes an exclusive control section 4 for selecting only one client from a plurality of client 21, 22, ..., a shared memory 3 that can be accessed by both the manager 1 and one of the clients 2 for performing data exchange therebetween, and an event notifying section 5 for notifying the manager 1 of the start of reading of the data in the shared memory 3 by each one of the clients 2.

The shared memory 3 consists of two parts, one being a shared memory for clients 31 into which data is written by each one of the clients 2 and from which it is read by the manager 1, and the other being a shared memory for the manager 32 which provides for data writing and reading by both the manager 1 and each one of the clients 2. The shared memory for the manager 32 has an area into which the status of the shared memory for clients 31 is written. The information that can be written into this area by the manager 1 indicates whether the shared memory for clients 31 is enabled (or available) or disabled (or forbidden). When the shared memory for the manager 32 indicates that the shared memory for clients 31 is available, clients 2 are capable of writing information into that shared memory 31. Otherwise, clients 2 are forbidden from writing information into the shared memory for clients 31 at which point the shared memory for the manager 32 indicates that the shared memory for clients 31 is being used.

The operation of processing with the apparatus shown in FIG. 1 is described below with reference to FIGS. 2–4. For purposes of this example, the client 21 requests processing by the manager 1.

Figure 2:
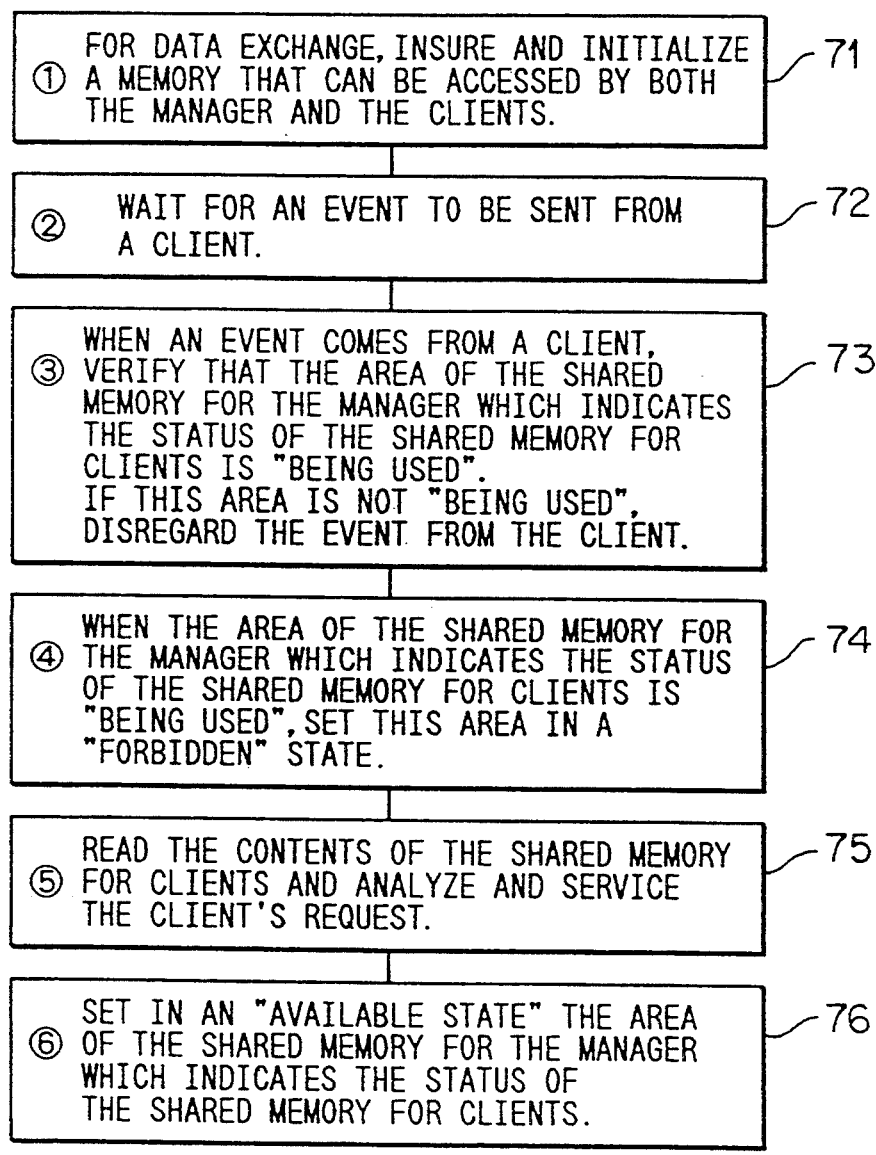
FIG. 2 is a flow diagram of general operations performed by the managing process.
Figure 3:
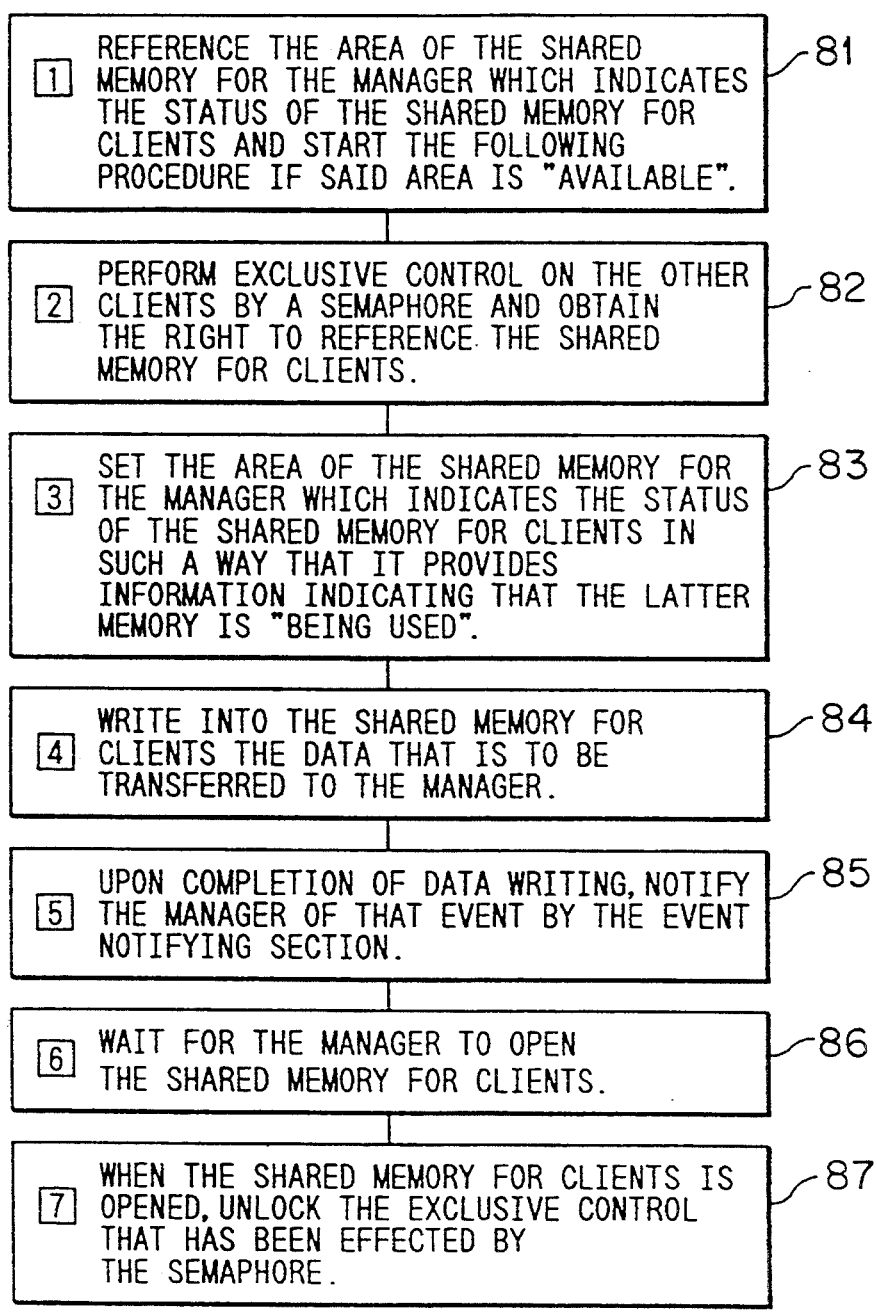
FIG. 3 is a flow diagram of general operations performed by each of the client processes.

As shown in FIG. 2, the processing by the manager begins with the initialization of a memory region that can be accessed by both the manager 1 and the clients 2. In other words, regions for the shared memory for clients 31 and for the shared memory for the manager 32 are insured and initialized before beginning the exchange of data and servicing requests of the client 21 (Step 71).

Next, the manager 1 enters a wait state at which time it awaits notification from the event notifying section 5 that the client 21 requests processing (Step 72).

When the manager 1 receives notification of an event from the client 21, the manager 1 verifies that information indicating that the shared memory for clients 31 is being used has been written into the area of the shared memory for the manager 32 which is provided for writing (setting) information that indicates the status of the shared memory 31. If the information set in that area does not indicate that the shared memory 31 is being used, the event from the client 21 will be disregarded since the client does not intend to use the shared memory for clients 31 (Step 73).

When information indicating that the shared memory for clients 31 is being used has been set in the area of the shared memory for the manager 32, the manager 1 resets that area to provide information indicating that access is forbidden. The reset information thus indicates not only that the shared memory for clients 31 cannot be accessed, but also that the manager 1 is servicing the request of the client 21 (Step 74).

Next, the manager 1 reads the contents of the shared memory of the clients 31, analyzes the request of client 21 in the memory 31 and services it (Step 75).

Upon completion of the servicing of the request of client 21 in shared memory 31, the manager 1 sets information in the status area of the shared memory 32 which indicates that the shared memory 31 is available. Thus, the manager 1 is now able to honor the request of the next one of the clients 2.

The steps of processing by the clients 2 are now described with reference to FIG. 3. Also for purposes of this example, client 21 requests processing by the manager 1.

A client, such as client 21, that requests data exchange with the manager 1 first accesses the area of the shared memory 32 in which the status of the shared memory 31 is set. If the contents of the information set in that status area indicate that the shared memory 31 is available (i.e., the manager 1 is capable of honoring the request of a client), the client starts its processing (Step 81).

First, the client 21, requesting data exchange with the manager 1, prohibits access to the shared memory 31 by other clients through the exclusive control by the exclusive control section 4, whereby the client 21 acquires the right to make reference to said shared memory 31 to the exclusion of other clients (Step 82).

The client then sets the status area of the shared memory 32 so that it provides information indicating that the shared memory 31 is being used (Step 83). The client then writes into the shared memory 31 not only the type of the job it requests for processing by the manager 1 but also any other necessary data (Step 84).

Upon completion of data writing into the shared memory 31, the client 21 informs the manager 1 of that event through the event notifying section 5 (Step 85). After that, the client waits for the manager 1 to release the shared memory 31 (Step 86).

When the manager 1 opens the shared memory 31, the client unlocks the exclusive control that has been effected by the exclusive control section 4 (Step 87).

Figure 4:
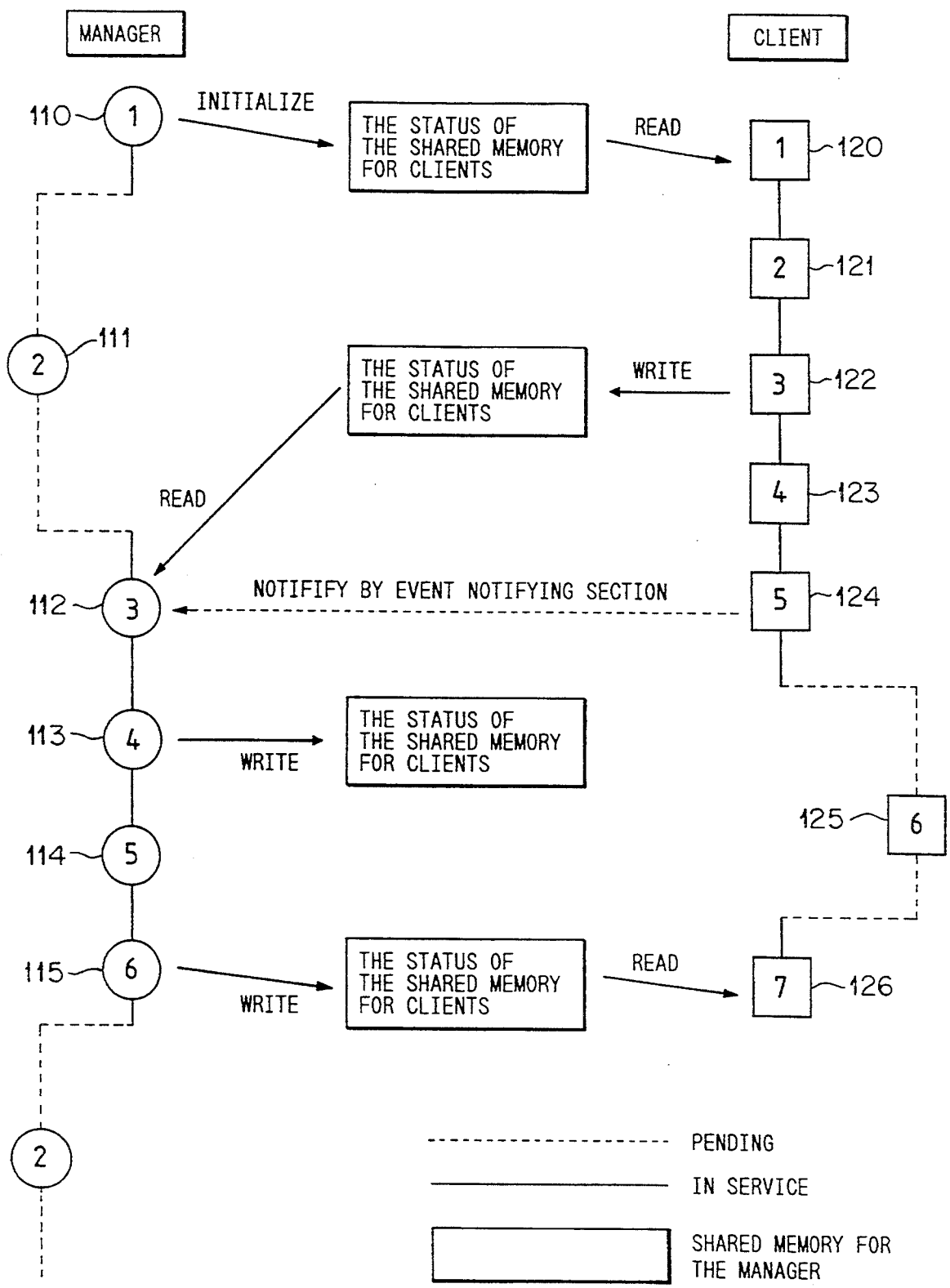
FIG. 4 is a diagram used to illustrate the relationship between the processing of the managing process and one of the client processes.

FIG. 4 shows the relationship between the processing performed by a manager, such as the manager 1 of FIG. 1 and the processing performed by a plurality of clients, such as clients 2 of FIG. 1. Numerals encircled on the left side of the diagram correspond to steps 71 to 76, respectively, in FIG. 2. Numerals enclosed with squares on the right side of the diagram correspond to steps 81–87 in FIG. 3. The rectangles in the center of the diagram denote the contents of the shared memory for the manager 531, in which a manager and clients store information on the status of the shared memory for clients, possible status information may indicate that shared memory for clients 32 is available, being used or unavailable (forbidden). FIG. 4 will be described in detail below with reference to the apparatus shown in FIG. 5.

In the example illustrated above with reference to FIGS. 1–4, the shared memory for clients 31 and the shared memory for the manager 32 are provided, with the former being used to transfer the request of a certain one of the clients 2 and associated data to the manager 1 so that the manager 1 is informed of the completion of the writing of the client's request and associated data into the shared memory for clients 31 by means of the event notifying section 5. As a result, the requests for processing sent from each of the plurality of clients 2 are correctly processed one by one to the manager.

Further, in response to the notification, the manager indicates in the shared memory 32 not only that it is servicing the request of an individual client but also that said servicing has been completed, whereby the other clients become aware of the current status of the manager 1. In this manner, the competition for the shared memory for clients 31 between individual clients can be totally eliminated to provide a highly reliable interprocess communications control system.

Figure 5:
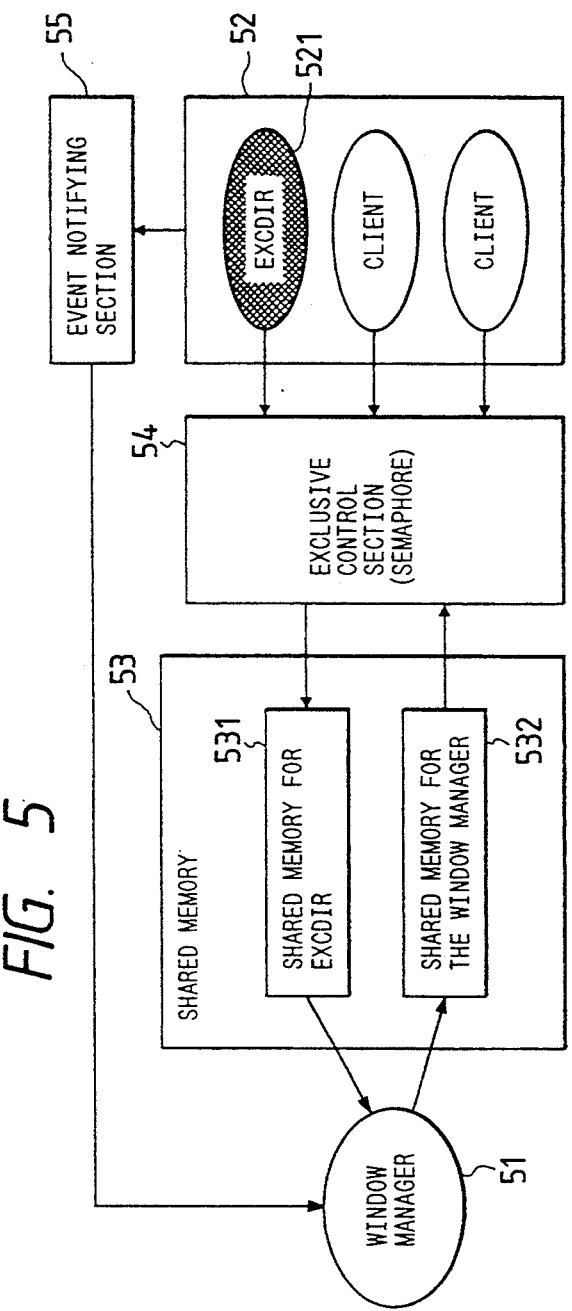
FIG. 5 is a diagram used to illustrate an implementation of an interprocess communications control system according to the present invention.

A specific example of processes to be controlled by the system of the present invention is described below with reference to FIG. 5. FIG. 5 shows an apparatus for controlling interprocess communications that uses a window manager 51 (or XWindow) as a managing process, with a tool or program called "excdir" 521 for changing the current directories in the window manager 51 being used as a client process. Excdir 521 is composed by means of the interprocess communications control system of the present invention. In other words, excdir 521 includes the steps of the process disclosed above with reference to FIG. 3.

The apparatus shown in FIG. 5 also includes a shared memory 53, a shared memory for excdir 531, a shared memory for the window manager 532, an exclusive control section 54, an event notifying section 55, and a plurality of clients 52, each of which corresponds to the similar structure described above with reference to FIG. 1.

In the UNIX ® operating system[1]/ which is a known operating system for workstations, each of the tools or processes involved has a current directory which is designed to take over the one that is associated with a parent. In other words, when a certain tool is activated from the window manager, the current directory corresponding to the activated tool will be identical to that of the parent window manager. In UNIX, the files to be accessed are grouped in the same directory for each tool, so it will be convenient if the current directory of the tool to be activated from the window manager can be set in that directory. This may be accomplished by changing the current directory for each tool but this would be cumbersome if more than one tool is employed.

[1]/ UNIX is a registered trademark of AT&T Bell Laboratories for software operating systems.

To overcome this difficulty, the current directories in the window manager may be changed to a desired one and this is a convenient method to adopt since all of the current directories for the tools capable of being activated contain the corresponding files to be accessed.

Figure 6:
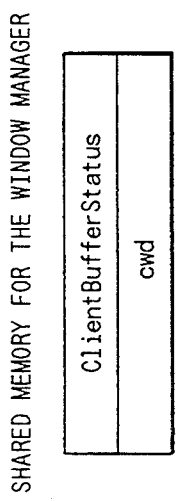
FIG. 6 is a diagram showing an example of an example of the composition of the memory region of a shared memory for excdir illustrated in FIG. 5.

As shown in FIG. 6, the shared memory for excdir 531 has a region labeled RequestType 61 for storing the type of request from the client, excdir 521, and a region for the data to be transferred from excdir 521 to the window manager 1 which is labeled Contents 62. In this example, the shared memory for excdir 531 is only intended for the tool excdir 521 to write data and for the window manager 51 to read data.

Figure 7:
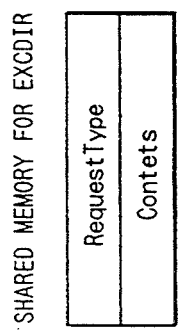
FIG. 7 is a diagram showing an example the memory region of a shared memory for window managing process illustrated in FIG. 5.

As shown in FIG. 7, the shared memory for the window manager 532 has an area for storing the status of the shared memory for excdir 531, or ClientBufferStatus 91, and an area for storing the current directories in the window manager 51, or cwd 92. The shared memory for the window manager 532 permits both data reading and writing by each of excdir 521 and the window manager 51.

Referring to FIGS. 4 and 5, the window manager 51 first initializes the respective regions of a shared memory for excdir 531 and a shared memory for the window manager 532 (Step 110). In initializing the portion of the shared memory for the window manager 532 that holds the status information regarding the status of the shared memory for excdir 531, or the ClientBufferStatus area 91 of FIG. 7, the window manager 51 sets the status information to indicate that the shared memory for clients 531 is available. After this step, the window manager 51 enters a wait state similar to that described above with reference to the manager 1 and FIG. 2. Further processing of the window manager 51 will be described below, however, first the operation of one of the client 52, excdir 521, will be described with reference to the process flows shown in FIG. 4.

Excdir 521 first accesses the ClientBufferStatus area 91 of the shared memory for the window manager 532 to see if the shared memory for excdir 531 is available (Step 120). ClientBufferStatus 91 may have a value identifying either one of the following three choices: available, reserved (data is being written by excdir 521), or forbidden (the window manager 51 is executing a job).

If the ClientBufferStatus indicates that the shared memory for client 531 is available, then excdir 521, which intends to communicate with the window manager 51, performs exclusive control of access to the shared memory for window manager 532 by means of the exclusive control section 54 of UNIX (Step 121). As a result, excdir 521 acquires the right to access the shared memory for window manager 532.

Next, excdir 521 changes the value of ClientBufferStatus 91 to indicate that the shared memory for excdir 531 is reserved (step 122). When excdir 521 changes the value of ClientBufferStatus 91 to indicate that the shared memory for excdir 531 is reserved, excdir 521 is about to store a request in the shared memory for excdir 531 to be processed by the window manager 51.

In the next step, excdir 521 sets information in the shared memory for excdir 531 (Step 123). For example, excdir 521 may set a request type "ChangeDir" in the RequestType area 61 of the shared memory for excdir 531 and write the name of the directory to be changed in the Contents area 61. When this data writing step is completed, excdir 521 informs the window manager 51 of the completion of data writing by means of the event notifying section 55 being set appropriately by, for example, the event creating capability function referred to as XStoreBuffer of the window manager 51 called XWindow (Step 124).

Subsequently, excdir 521 waits until the value of ClientBufferStatus 91 indicates that memory 531 is available (Step 125). When the shared memory for excdir 531 is no longer being reserved by excdir 521, the exclusive control of memory 532, managed by the exclusive control section 54, is unlocked so that the shared memory for window manager 532 becomes available for the next client (Step 126).

When receiving notification from excdir 521 that the write operation has been completed (Step 112), the window manager 51 changes the value of ClientBufferStatus 91 in the shared memory for the window manager 532 to indicate that access to memory 531 is forbidden (Step 113).

Making reference to the RequestType area 61 of the shared memory for excdir 531, the window manager 51 checks the type of request from excdir 521 which is the current client. Since the type of request from excdir 521 is, in this example, ChangeDir, the window manager 51 reads data from the Contents area 61 of the shared memory for excdir 531 in accordance with this request type. Subsequently, the window manager 51 executes the requested job according to the type of request identified by the client 521 using the data read from the Contents area 62.

In this example, RequestType 61 is ChangeDir and data is read on the assumption that a current directory is in the Contents area 62. When RequestType 61 is ChangeDir, the current directory of the window manager 51 is changed to the data in the Contents area 62, namely, the name of the directory requested by excdir 521 (Step 114).

Following this directory change, a new current directory is set in the cwd area 92 of the shared memory for the window manager 532 and the ClientBufferStatus 91 indicates that the memory 531 is available (Step 115).

Thus, the present invention provides for a system for controlling the interprocess communications between a single manager which is a process for managing a plurality of processes and a plurality of clients which are the plurality of processes that transmit data to and from the manager. The present invention also has an exclusive control means by which only one client for performing interprocess communications with the manager is selected from the plurality of clients, a shared memory which can be accessed by both the manager and the clients to perform data exchange between the manager and each client, and a notifying means which notifies the manager of data setting in the shared memory by each client.

In accordance with the first aspect of the present invention, when a client has completed the writing of data into the shared memory, the manager is notified of that event by the notifying means and is capable of reading the relevant client information from the shared memory in accordance with that notification. Thus, information is correctly received by the manager from the client so that the job requested by the client can be executed in the proper manner.

In accordance with the second aspect of the present invention, the manager indicates in the shared memory for the manager not only that it is servicing the request for processing made by a certain client but also that the servicing has been completed, so that the other clients can be aware of the status of the manager. In this way, the competition for the shared memory between individual clients is totally eliminated to insure control for highly reliable interprocess communications.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data processing system for controlling interprocess communications between a managing process and a plurality of client processes, wherein the managing process is a process for managing the operations of the plurality of client processes wherein each one of the client processes communicates data via a system bus to the managing process, the system comprising:

shared memory means, coupled to the system bus and accessible by the managing process and each of the plurality of client processes, for storing data including a request that is communicated between each of the plurality of client processes and the managing process and a result generated by said managing process in response to the request;

exclusive control means, coupled to the managing process and the plurality of client processes by the system bus, for excluding a second client process of the plurality of client processes from communicating with the managing process using the shared memory means when a first client of the plurality of client processes is communicating with the managing process and for excluding the first client process from communicating with the managing process using the shared memory means when the second client process is communicating with the managing process;

notifying means, coupled to the managing process and the plurality of client processes by the system bus, for notifying the managing process that the first client process has stored the data in the shared memory means to be retrieved by the managing process for processing to generate the result while said exclusive control means excludes the second client process from communicating with the managing process using the shared memory means; and release means, included in said exclusive control means, for permitting the second client process to communicate with the managing process using the shared memory means after the managing process has retrieved the data that the first client process stored in the shared memory means.

2. The system according to claim 1 wherein each one of the client processes communicates the request and data associated with the request to the managing process, wherein the managing process processes the data in accordance with the request, and wherein the shared memory means comprises:

a client memory portion, accessible by the plurality of client processes and the managing process, for storing data and a corresponding request from each one of the plurality of client processes;

means for effecting a read operation of the client memory portion by the managing process;

a manager memory portion, accessible by the plurality of client processes and the managing process, for storing a value indicating the current status of the client memory portion; and means for effecting, after the managing process has read the client memory portion, a read operation of the value stored in the manager memory portion by each one of the plurality of client processes.

3. The system according to claim 2 wherein the value indicating the current status of the client memory portion, which is stored in the manager memory portion, indicates that the client memory portion is at least one of available and reserved, wherein available indicates that the client memory portion is capable of being accessed by any one of the plurality of client processes, and reserved indicates that one of the plurality of client processes is currently accessing the client memory portion or that the managing process is currently reading the data and the corresponding request stored in the client memory portion by the one of the plurality of client processes.

4. An apparatus for controlling interprocess communications between a plurality of processes executed by a data processing system including a central processing unit (CPU) and a system bus, wherein the CPU sequentially processes the operations of the plurality of processes, and wherein the operations of a first process of the plurality of processes request communication with a second process of the plurality of processes, the apparatus comprising:

shared memory means, coupled to the system bus, for storing data associated with at least one of a first request of the first process to communicate with the second process and a second request of the second process to communicate with the first process, and for storing a first result generated by said second process in response to the first request and a second result generated by said first process in response to the second request;

exclusive controller means, coupled to the shared memory means via the system bus, for excluding all processes except the second process from accessing the shared memory means after the first process stores data associated with the first request in the shared memory means and for excluding the first process from accessing the shared memory means after the second process stores data associated with the second request in the shared memory means;

event notifying means, coupled to the shared memory means and the exclusive controller means via the system bus, for notifying the second process that the first process has requested communication with the second process and that the data associated with the first request is stored in the shared memory means, permitting the second process to generate the first result while said exclusive controller means excludes the first process from communicating with the second process using the shared memory means, and for notifying the first process that the second process has requested communication with the first process and that the data associated with the second request is stored in the shared memory means, permitting the first process to generate the second result while said exclusive controller means excludes the second process from communicating with the first process using the shared memory means; and release means, included in the exclusive controller means, for permitting all processes including the second process to access the shared memory after the second process generates the first result and for permitting all processes including the first process to access the shared memory after the first process generates the second result.

* * * * *